(12) United States Patent
Huber et al.

(10) Patent No.: US 6,188,580 B1
(45) Date of Patent: Feb. 13, 2001

(54) SMART CARD AND SEMICONDUCTOR CHIP FOR USE IN A SMART CARD

(75) Inventors: Michael Huber, Nittendorf/Undorf; Peter Stampka, Schwandorf-Klardorf; Detlef Houdeau, Langquaid, all of (DE)

(73) Assignee: Infineon Technologies AG, Munich (DE)

( * ) Notice: Under 35 U.S.C. 154(b), the term of this patent shall be extended for 0 days.

(21) Appl. No.: 09/246,774

(22) Filed: Feb. 8, 1999

Related U.S. Application Data

(63) Continuation of application No. PCT/DE97/01479, filed on Jul. 14, 1997.

(30) Foreign Application Priority Data

Aug. 8, 1996 (DE) .............................. 196 32 113

(51) Int. Cl.⁷ ...................................... H05K 5/11
(52) U.S. Cl. .................... 361/737; 361/767; 361/783; 361/807; 257/786
(58) Field of Search .................... 361/736, 737, 361/752, 760, 783, 679, 767, 803, 807–810; 257/690, 692, 773, 779, 786; 235/492; 439/946

(56) References Cited

U.S. PATENT DOCUMENTS 4,994,659 * 2/1991 Yabe et al. ........................ 235/492
5,208,450   5/1993 Uenishi et al. .
5,822,190 * 10/1998 Iwasaki ............................. 361/737
5,880,934 *  3/1999 Haghiri-Tehrani ................. 361/737
5,917,706 *  6/1999 Steffen ............................. 361/773

FOREIGN PATENT DOCUMENTS 0 207 852      1/1987  (EP) .
0 323 295 B1   5/1993  (EP) .
0 716 394 A2   6/1996  (EP) .
2 695 234 A1   3/1994  (FR) .

OTHER PUBLICATIONS

International Application Wo 92/08209 (Jurisch), dated May 14, 1992.

* cited by examiner

*Primary Examiner*—Jayprakash N. Gandhi
(74) *Attorney, Agent, or Firm*—Herbert L. Lerner; Laurence A. Greenberg; Werner H. Stemer

(57) ABSTRACT

The smart card has a card body and a plurality of contact areas exposed on a flat surface of the card body. The contact areas are fabricated from electrically conductive material and are electrically connected to contact terminals, which are assigned to an electronic circuit formed on the semiconductor substrate of a semiconductor chip. The contact areas are fabricated as a structured coating on a main surface of the semiconductor chip. The semiconductor chip, after fabrication with the contact areas is inserted and fixed in a receptacle opening in the card body of the smart card in such a way that the contact areas extend essentially flush with the outer face of the card body. In order to ensure sufficiently high mechanical flexibility, the thickness of the silicon substrate of the chip is preferably less than about 100 μm.

16 Claims, 1 Drawing Sheet

SMART CARD AND SEMICONDUCTOR CHIP FOR USE IN A SMART CARD

CROSS-REFERENCE TO RELATED APPLICATION

This is a continuation of copending International Application PCT/DE97/01479, filed Jul. 14, 1997, which designated the United States.

BACKGROUND OF THE INVENTION

1. Field of the Invention

The invention relates to a smart card with a card body and a plurality of contact areas formed of electrically conductive material. The contact areas are electrically connected to contact terminals assigned to an electronic circuit formed on the semiconductor substrate of a semiconductor chip. The invention also relates to a semiconductor chip with contact terminals assigned to an electrical circuit formed on the semiconductor substrate of the semiconductor chip.

2. Description of the Related Art

Such smart cards and also semiconductor chips for use in a smart card have been disclosed for example by Rankl and Effing, Handbuch der Chipkarten [Smart card reference book], Carl Hanser Verlag, Munich/Vienna, 1995. According to Rankl and Effing, during the production of smart cards, so-called chip modules were fabricated first of all, the chip modules constituting intermediate products which can be produced as self-contained units in terms of production engineering and can be processed further independently to form end products. A chip module is in that case understood to mean a configuration in which an electrically insulating carrier has arranged on or in it one or more integrated semiconductor circuits in the form of chips or integrated circuits which are connected via connecting terminals to a conductor track system provided on one side or on both sides of the carrier. The carrier generally constitutes a flexible film on which the actual chip is mounted and on which the contact areas of the smart card are situated. The contact areas are usually gold-plated. During the production of such a chip module, essentially two different techniques are used to pack the semiconductor chip onto the carrier film: namely the so-called TAB technique (tape automated bonding) and the wire bonding technique. In the TAB technique, metallic bumps are firstly electrodeposited on the pads of the semiconductor chip, the conductor tracks of the carrier film subsequently being soldered onto the bumps. The soldered joint is mechanically loadable in such a way that the chip itself need not be fixed any further, but rather simply hangs from the conductor tracks. The advantage of the TAB method resides in the high mechanical loadability of the chip connections and in the small structural height of the module. However, this advantage has to be acquired at a greater expense than the wire bonding module. In the case of the latter, a plastic film is once again provided as the carrier material, the gold-coated contact areas being electrodeposited on the front side of the plastic film. Holes are stamped on the carrier film in order to accommodate the chip and the wire connections. The chip is then fixed into the stamped-out portion provided from the rear side on the conductor track (die bonding). The chip terminals are subsequently connected by thin wires (a few micrometers) to the rear side of the contacts. Finally, the chip and the bonding wires are protected against environmental influences by a potting compound. The advantage of this method resides in the fact that this largely follows the method for packaging chips in standard housings which is customary in the semiconductor industry, and it is consequently less expensive. The disadvantage resides in the fact that both the structural height and the length and width of the module are distinctly greater than those of the TAB module, because not only the chip but also the bonding wires have to be protected by the covering compound. This also magnifies the problems, however, when the modules are incorporated in the smart card.

European patent application EP 0 207 852 A1 describes a module that is constructed similarly to a TAB module. There, the semiconductor chip likewise has soldering bumps which are connected to conductor tracks on a carrier film. However, the conductor tracks are in that case pressed by means of a punch in the manner of a deep-drawing process through cutouts in the carrier film, so that they can then be connected to the soldering bumps. That process is very complicated, however. In addition, the soldering bumps must be positioned very accurately in order to ensure a clean connection to the conductor tracks.

The individual chip modules are subsequently stamped from the finished mounted film and introduced into the smart card. In the method, the semiconductor chip is not directly fixed in the card, which has the advantage that the bending forces which arise during mechanical loading of the card are largely kept away from the semiconductor chip. All previously disclosed module construction techniques or housing technologies from the smart card sector share the objective of protecting the integrated circuit against mechanical loading on account of bending or torsion, which can lead to the destruction of the integrated circuit on account of its brittle material properties. The standard thickness of the integrated circuits or semiconductor chips used in smart cards is about 200 $\mu$m at the present time. The modulus of elasticity of silicon here is of the order of magnitude of $190 \times 10^3$ N/mm$^2$. The material behavior of the silicon chip is thus extremely brittle. Protection of the sensitive semiconductor chip afforded by the housing is cost-intensive owing to the requisite outlay in terms of mounting and material and time-consuming owing to the mounting and production steps to be carried out only after the fabrication of the integrated circuit.

SUMMARY OF THE INVENTION

It is accordingly an object of the invention to provide a configuration with an integrated semiconductor circuit, which overcomes the above-mentioned disadvantages of the heretofore-known devices and methods of this general type and which is simpler than previously disclosed chip modules, which can be utilized for use in a smart card and, in particular, satisfies the bending loads predetermined for smart cards.

With the foregoing and other objects in view there is provided, in accordance with the invention, a smart card, comprising:

a card body formed with a receptacle opening and having an outer face;

a semiconductor chip formed with a semiconductor substrate, an electronic circuit formed on the semiconductor substrate, and contact terminals connected to the electronic circuit;

the semiconductor chip having a main surface facing the electronic circuit and being formed with a structured coating defining electrically conductive contact areas connected to the contact terminals, the contact areas being completely supported by the semiconductor substrate; and the semiconductor chip with the contact areas being inserted and fixed in the receptacle opening in the card body with the contact areas aligned substantially flush with the outer face of the card body.

In other words, the invention provides for the contact areas to be fabricated in the form of a structured coating on a main surface of the semiconductor chip, i.e. the main surface with the electronic circuit, and for the semiconductor chip fabricated together with the contact areas to be inserted and fixed in a receptacle opening in the card body of the smart card in such a way that the contact areas extend essentially flush with the outer face of the card body. The contact areas are thus structural magnifications of the otherwise very small contact terminals.

The invention is firstly based on the insight of completely departing from the chip module which has always been fabricated as an intermediate product, and of proposing moduleless fabrication of a smart card in which the semiconductor chip is directly provided with the necessary contact areas, and of directly implanting into the card body the semiconductor chip, which is fabricated together with the contact areas, directly, that is to say without any carrier or support films or other measures protecting the semiconductor chip against mechanical loading. The contact areas, which are preferably fabricated according to the previous ISO standard in respect of the external dimensions, are thus completely supported by the semiconductor substrate of the chip or of the integrated circuit; the substrate correspondingly has for this purpose the base area required by the contact areas proceeding according to the ISO standard. The base area is distinctly greater in relation to the semiconductor chips used hitherto. However, this disadvantage is more than compensated for by the following advantages which are afforded on account of the novel solution: On the one hand, it becomes possible for the contact areas to be produced in a manner that departs from the previous costly and time-consuming mounting directly after the completion of the electronic circuits in front-end operation, whilst still in the wafer composite of the semiconductor chips which have not yet been severed from one another, preferably using the coating methods which are customarily used for the deposition and structuring of metal layers in semiconductor technology. After the individual semiconductor chips have been sawn or mechanically separated to the corresponding grid pattern, the semiconductor chip provided with the contact areas is connected to the card body by means of suitable bonding techniques, preferably fixed permanently within the receptacle opening in the card body by means of an adhesive or bonding material. In principle, all currently known implantation techniques are suitable for this purpose, that is to say, for example, a hot melt fitting technique, a fitting by means of cyanocrylate adhesive, a fitting by means of a pressure-sensitive adhesive film, or another physical bonding technique.

In accordance with an added feature of the invention, the semiconductor chip carrying the contact areas on the main surface thereof is fixed permanently within the receptacle opening in the card body by means of an adhesive or a bonding material.

Preferably, in order to form the receptacle opening, a hole is milled into the finished card body, the semiconductor chip equipped with the contact areas subsequently being bonded into said hole. However, the invention can equally well be used with smart cards produced in a lamination process, in which the smart card is produced by laminating different films, the covering films and the inlay films, it being the case that before the lamination operation, appropriate holes are stamped into the films and then the semiconductor chip is inserted, and the semiconductor chip is fixedly welded to the card body. Furthermore, the solution according to the invention is also suitable for card bodies which are produced in an injection-molding process. In this case, the entire card body including the cutout for the semiconductor chip is produced as an injection-molded part and the semiconductor chip is bonded therein.

The lateral dimensions of the receptacle opening in the card body, said opening receiving the semiconductor chip approximately with an accurate fit, are determined by the required functionality of the integrated circuit or of the semiconductor chip and by the desired dimensions, or dimensions required in accordance with the ISO standard, of the contact areas. The particularly preferred embodiment of the invention is based on the semiconductor material silicon, in particular crystalline silicon. Furthermore, it is likewise possible, however, for cost reasons, to use a different economical semiconductor material, which is ideally produced with a wafer diameter of greater than six inches.

In accordance with an additional feature of the invention, the semiconductor substrate, which is preferably a silicon substrate, has an increased flexibility (relative to the prior art systems) in that its thickness is distinctly less than 200 $\mu$m, preferably less than 150 $\mu$m, and particularly a thickness in the range of 50–100 $\mu$m. By contrast, the standard thickness of the semiconductor chips implanted heretofore in smart cards is currently about 200 $\mu$m.

The modulus of elasticity of silicon here is of an order of magnitude of $190 \times 10^3$ N/mm$^2$, and the material behavior of the silicon chip is thus extremely brittle. As the chip thickness decreases, however, the flexibility of the silicon chip increases in respect of bending. This effect is additionally reinforced by rear-side thinning processes after the grinding of the silicon wafers, such as damage etching. The atomic defects in the semiconductor chip which are caused by the rear-side grinding (dislocations and the like) and, under certain circumstances, drastically increase the probability of chip breakage in the event of bending loads are virtually precluded by subsequent etching of the rear side of the chip by about 4 to 7 $\mu$m.

In accordance with another feature of the invention, a thin insulation layer is applied on the main surface of the semiconductor substrate carrying the electronic circuit, the contact areas being deposited on the thin insulation layer in the form of a structured coating.

With the above and other objects in view there is also provided, in accordance with the invention, a semiconductor chip assembly that is particularly suitable for use in the above-described smart card. The chip assembly comprises:

a semiconductor substrate with an electrical circuit formed in a main surface of the semiconductor substrate;

contact terminals electrically connected to the electrical circuit on the semiconductor substrate; and contact areas electrically connected to the contact terminals fabricated in the form of a structured coating on the main surface of the semiconductor substrate, whereby the contact areas are completely supported by the semiconductor substrate.

In accordance with again another feature of the invention, the structured coating has a total thickness of about 30 $\mu$m to about 50 $\mu$m.

In accordance with a concomitant feature of the invention, the structured coating for the contact areas comprises a plurality of electrically conductive coating layers.

The preferred structure of a semiconductor chip, equipped with the contact areas, for use in a smart card is consequently distinguished by the fact that a thin layer made of a material having dielectric properties, in the case of which the pad areas are cut out, is deposited directly on the semiconductor substrate having a structured surface with the components for the electronic circuit and the pad metalization layer (contact connections). Optionally, a resistive intermediate layer may also be applied. Applied above the dielectric is an electrically conductive layer whose contact areas are connected to the pad areas and which are electrically insulated with respect to one another, by means of air gaps in the simplest case. In this case, the contact areas satisfy the corresponding ISO standard (ISO 7810-2 regulation). Optionally, the electrically conductive layer may be composed of a noble metal such as gold, AuCo, NiPAu, hard nickel/Au, in one or more layers, or other suitable materials, the outermost layer being selectable, on the material side, for the purpose of good tribological properties and improved corrosion resistance, for example a thin, about 2 $\mu$m thick, electrically conductive carbon coating with good mechanical hardness properties.

Other features which are considered as characteristic for the invention are set forth in the appended claims.

Although the invention is illustrated and described herein as embodied in a smart card, method for the production of a smart card and semiconductor chip for use in a smart card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
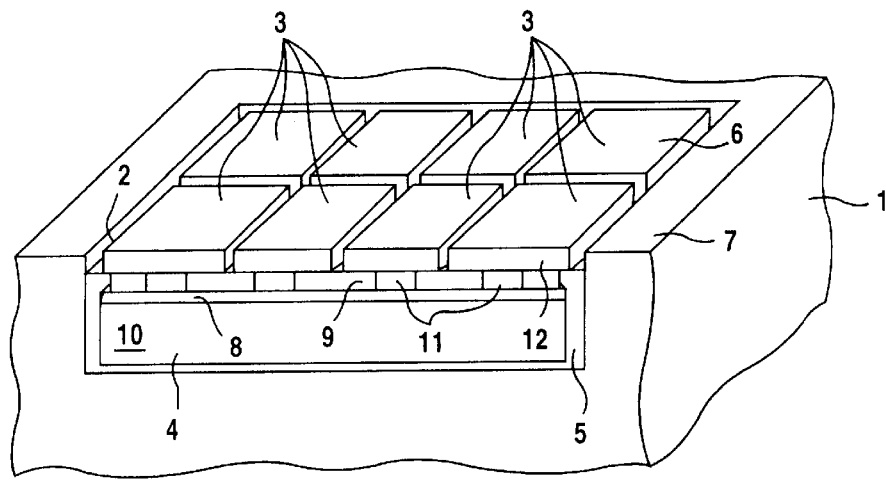
FIG. 1 is a partly broken away, partly diagrammatic sectional view of a smart card with a card body and a semiconductor chip, fixed in a cavity in the card body and provided with contact areas, in accordance with an exemplary embodiment of the invention.

Referring now to the figures of the drawing in detail and first, particularly, to FIG. 1 thereof, which is not drawn true to scale, the detail of the smart card shown therein has a card body 1 with customary external dimensions of 85 mm×54 mm×1 mm. A receptacle opening or cavity 2 is formed into the card body, produced by milling, and a semiconductor chip 4 equipped with contact areas 3 is permanently fixed in the cavity 2. The chip 4 is held by means of an adhesive material 5 in such a way that the outer surfaces 6 of the contact areas 3 extend essentially flush with an outer face 7 of the card body 1.

The semiconductor chip 4 comprises a silicon substrate having a thickness of about 40 $\mu$m, on which the components or structures required for forming the electronic circuit are fabricated by means of customary semiconductor technology steps. The components having a structural height of about 10 $\mu$m. The components or structures for forming the electronic circuit are covered, in a customary manner, with a protective $Si_3N_4$ layer having a thickness of about 3 $\mu$m. In FIG. 1, for the sake of simplicity, the aforementioned structures and the $Si_3N_4$ layer are indicated only diagrammatically as one layer and are provided with the reference symbol 8. Following the formation of a pad metalization layer for fabricating the pads or contact terminals 11, a thin insulation layer 9 made of a dielectric material having a thickness of 20 $\mu$m is deposited. The insulation layer is cut out at the locations of the contact terminals 11. The surface thus formed has a thin metallic coating 12 deposited on it, which is structured using the lithography processes known from semiconductor technology for the purpose of fabricating the contact areas 3 which are electrically insulated from one another. Consequently, each contact area 3 is electrically connected to the associated contact terminal 11 of the electronic circuit.

Figure 2:
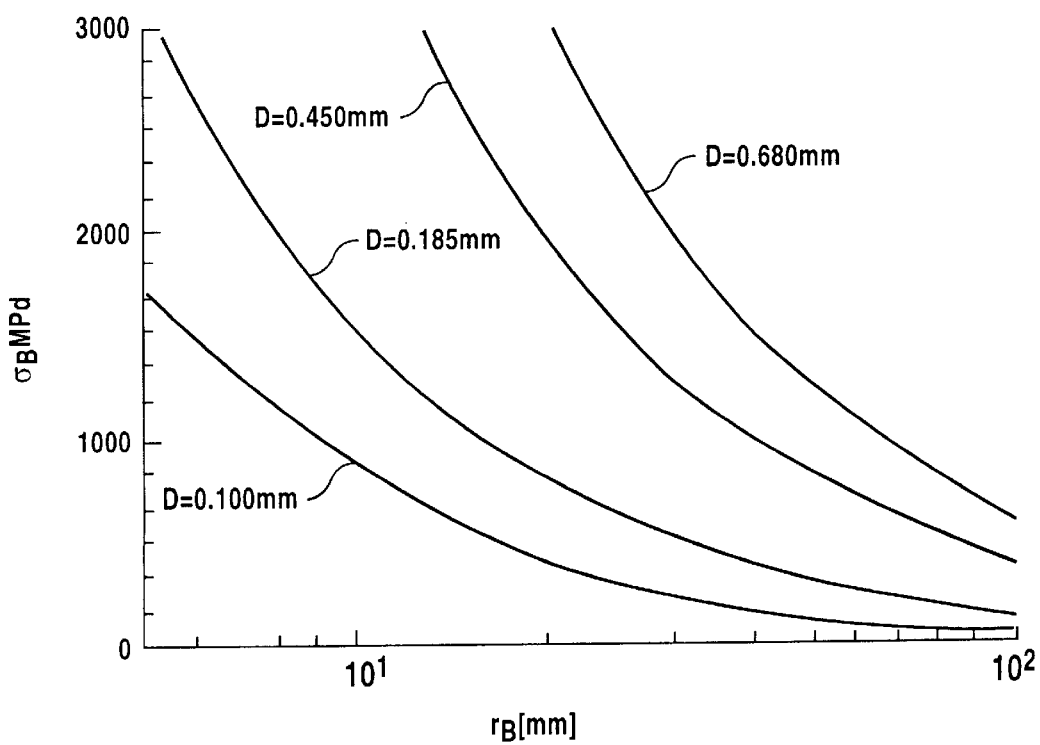
FIG. 2 is a graph illustrating the dependence of the bending stress on the bending radius of a silicon base material for a number of selected thicknesses of the silicon material.

Referring now to FIG. 2, there is shown the dependence of the bending stress $\sigma_B$ on the bending radius $r_B$ for a number of selected thicknesses of a silicon base material. It is evident that when the substrate thicknesses of the semiconductor chip are less than 100 $\mu$m, the chip is already so flexible in respect of bending and torsion that it can withstand the mechanical ISO requirements without any additional housing protection. The inventors' investigations have shown that even with such small chip thicknesses, it is possible to fabricate integrated circuits with sufficient yield.

To summarize, the solution according to the invention succeeds in producing a moduleless integrated circuit, which is easy to fabricate, for use in a customary smart card, it being the case that no complicated process steps in the so-called back-end production stage are necessary, at the same time it is possible to obviate the developments of special housing and/or package forms for the desired use. Those developments, of course, are as a rule associated with high costs and outlays. Also, a high economic benefit is afforded in conjunction with a considerable reduction in the necessary outlay in terms of logistics on the part of the smart card manufacturer.

We claim:

1. A smart card, comprising:
  a card body formed with a receptacle opening and having an outer face;
  a semiconductor chip formed with a semiconductor substrate, an electronic circuit formed on said semiconductor substrate, and contact terminals connected to said electronic circuit;
  said semiconductor chip having a main surface facing said electronic circuit and being formed with a structured coating defining electrically conductive contact areas connected to said contact terminals, said contact areas being completely supported by said semiconductor substrate and being exposed to the environment; and
  said semiconductor chip with said contact areas being inserted and fixed in said receptacle opening in said card body with said contact areas aligned substantially flush with said outer face of said card body.

2. The smart card according to claim 1, wherein said semiconductor chip carrying said contact areas on said main surface thereof is fixed permanently within said receptacle opening in the card body with a material selected from the group consisting of adhesive and bonding material.

3. The smart card according to claim 1, wherein said semiconductor substrate has a thickness of distinctly less than 200 $\mu$m for increasing a flexibility thereof.

4. The smart card according to claim 1, wherein said semiconductor substrate has a thickness of less than 150 $\mu$m for increasing a flexibility thereof.

5. The smart card according to claim 1, wherein said semiconductor substrate has a thickness of less than 100 μm for increasing a flexibility thereof.

6. The smart card according to claim 1, wherein said semiconductor substrate is a silicon substrate.

7. The smart card according to claim 1, which further comprises a thin insulation layer applied on said main surface of said semiconductor substrate carrying said electronic circuit, said contact areas being deposited on said thin insulation layer in the form of a structured coating.

8. A semiconductor chip assembly, comprising:
   a semiconductor substrate with an electrical circuit formed in a main surface of said semiconductor substrate;
   contact terminals electrically connected to said electrical circuit on said semiconductor substrate;
   contact areas electrically connected to said contact terminals fabricated in the form of a structured coating on the main surface of said semiconductor substrate, whereby said contact areas are completely supported by said semiconductor substrate and are exposed to the environment.

9. The semiconductor chip assembly according to claim 8, which further comprises a thin insulation layer applied on said main surface of said semiconductor substrate, said contact areas being deposited on said insulation layer in the form of a structured coating.

10. The semiconductor chip assembly according to claim 8, wherein said semiconductor substrate has a thickness of distinctly less than 200 μm for increasing a flexibility thereof.

11. The semiconductor chip assembly according to claim 8, wherein said semiconductor substrate has a thickness of less than 150 μm for increasing a flexibility thereof.

12. The semiconductor chip assembly according to claim 8, wherein said semiconductor substrate has a thickness of less than 100 μm for increasing a flexibility thereof.

13. The semiconductor chip assembly according to claim 8, wherein said semiconductor substrate is a silicon substrate.

14. The semiconductor chip assembly according to claim 8, wherein said semiconductor substrate is formed of silicon and has a thickness of between 50 μm and 100 μm.

15. The semiconductor chip assembly according to claim 8, wherein said structured coating has a total thickness of about 30 μm to about 50 μm.

16. The semiconductor chip assembly according to claim 8, wherein said structured coating for said contact areas comprises a plurality of electrically conductive coating layers.

* * * * *